United States Patent [19]
Pruvot

[11] 3,934,948
[45] Jan. 27, 1976

[54] SELF-PRESSURIZING AND SELF-COMPENSATING HYDROSTATIC BEARING

[75] Inventor: Francois Claude Pruvot, Pully (VD), Switzerland

[73] Assignee: Regie Nationale des Usines Renault, Boulogne-Billancourt, France

[22] Filed: July 9, 1974

[21] Appl. No.: 486,934

[30] Foreign Application Priority Data
July 20, 1973 France .......................... 73.26826

[52] U.S. Cl. ..................... 308/9; 308/36.1; 308/76; 308/78
[51] Int. Cl.².. F16C 1/24; F16C 7/04; F16C 33/72; F16C 37/00
[58] Field of Search .................. 308/9, 36.1, 78, 76

[56] References Cited
UNITED STATES PATENTS

| | | | |
|---|---|---|---|
| 3,475,065 | 10/1969 | Weichsel | 308/9 |
| 3,661,432 | 5/1972 | Aihara | 308/9 |
| 3,711,167 | 1/1973 | Ennis | 308/9 X |

Primary Examiner—M. Henson Wood, Jr.
Assistant Examiner—Howard Beltran
Attorney, Agent, or Firm—Oblon, Fisher, Spivak, McClelland & Maier

[57] ABSTRACT

A self-pressurizing and self-compensating hydrostatic bearing includes a thin bushing having fluid pockets and supply channels provided therein, the bushing being mounted within a bearing support housing. An annular space or chamber is maintained between the two components in order to accommodate radial deformation of the bushing under the influence of an increased pressure prevailing within the pockets of the bushing to facilitate fluid circulation as a result of an increase in rotational speed of a spindle supported by means of the bearing. The gap between the lands of the bushing, defining the pockets and channels, and the shaft or spindle, increases with an increasing speed of rotation of the shaft or spindle, such thereby essentially nullifying or preventing a rise in temperature of the fluid.

12 Claims, 5 Drawing Figures

SELF-PRESSURIZING AND SELF-COMPENSATING HYDROSTATIC BEARING

BACKGROUND OF THE INVENTION

1. Field of the Invention

The present invention relates generally to hydrostatic bearings which can withstand a radial or axial load exerted, by means of an element rotating at high speed, such as for example, the spindle of a machine tool, upon a stationary element or vice versa, and more particularly to machine tool spindles wherein the loads are small however the increased cushioning effects afforded by means of the hydrostatic bearings serve to maintain a high degree of rigidity and thus firm guidance of the spindle which makes possible the precise machining of surfaces by means of the machine tool.

2. Description of the Prior Art

Hydrodynamic bearings having lobes have long been used in the form of journal bearings having radial projections at right angles to which the clearance between the rotating shafts and the bearings were very small. Such bearings are sometimes provided with means for adjusting the clearance by deformation in order to compensate for wear. It is also well known however that such bearings having lobes exhibit the drawback or disadvantage of high energy dissipation when the shaft speed increases, the result being a substantial rise in the temperature of the cushioning fluid which effect has many deleterious disadvantages.

Hydrostatic bearings having cavities or pockets bounded by sealing lands approaching to within a very small distance from the rotating shaft are also known and within such bearings of conventional type each pocket is individually supplied with pressurized cushioning fluid by means of a restricted passageway. It is known that the pressure within each of the pockets of such a bearing, that is, the cushioning effect of the bearing, decreases as the clearance between the sealing lands and the peripheral surface of the rotating shaft increases, and such hydrostatic bearings of the conventional type exhibit the drawback or disadvantage that the restrictions are liable to become blocked whereupon external pumping means become necessary. In addition, it is likewise known that these conventional hydrostatic bearings are functionally limited with respect to operating speed. In fact, if one considers the ratio of the power dissipated within the bearing by the shearing of the film of oil between the bearing and the rotating shaft to the pumping power, it can be shown that in practice this ratio must never exceed a value of the order of 3 to 5.

The pumping power, as is known, is equal to the product of the hydrostatic flow multiplied by the pump pressure. It has been found that as the speed of rotation of the shaft or spindle cushioned by the hydrostatic bearing increases, there is a large increase in the power dissipated within the bearing. It can also be shown that, at constant temperature, the power dissipated within the bearing as a result of the shearing of the oil film increases as the square of the speed of rotation of the spindle. In effect, as the pumping power is independent of the speed of rotation of the spindle, the flow of oil to the hydrostatic bearing is also independent thereof, the result being that the temperature of the exiting oil keeps increasing as the speed of rotation of the spindle increases, such being expressed as follows:

$$T = a + kV^2$$

wherein $T$ is the temperature of the exiting oil, $V$ is the speed of rotation of the spindle, and $k$ is a constant dependent upon the geometry of the bearing and the characteristics of the oil. It follows that a conventional hydrostatic bearing designed for low speed operation cannot be used for high speed operation which constitutes a very serious handicap which naturally limits the use of conventional hydrostatic bearings.

This disadvantage could theoretically be eliminated by increasing the pumping power, pressure, or the flow of fluid within the bearings. However, for reasons of reliability and convenience, an increase in pressure is limited in practice and an increase in pumping power can be obtained only by increasing the flow of fluid within the bearing, that is, by increasing the clearance between the bearing and the rotating shaft. Such large operating clearances entail higher degrees of pumping power, thus causing additional heating of the pressurized oil which can pose delicate practical problems if the volume of the oil is not sufficiently large. Finally, the supply of fluid to the bearings and the return of the fluid from the bearings present great difficulties, particularly because the size of the hydraulic circuitry required increases rapidly.

The self-pressurizing hydrostatic bearing described within French Pat. No. 2,157,107, issued May 7, 1973 offers significant improvement over conventional hydrostatic bearings, the cushioning pockets being supplied with fluid by means of channels which are bounded, as are the pockets, by means of sealing lands integral with an element of the bearing and extending to within a very small distance from the spindle surface. Compared to hydrostatic bearings of conventional design, the self-pressurizing bearing permits a reduction in the temperature rise with speed. More particularly, it can be shown that the pressure within the cushioning pockets is proportional to the speed of rotation of the spindle. if it is accepted that in practice the viscosity of the fluid remains constant, it follows that the temperature of the return fluid is an increasing linear function of the spindle speed, and such may be expressed as follows:

$$T = a' + K'V$$

wherein $T$ is the temperature of the exiting fluid, $V$ is the rotational speed of the spindle, and $K'$ is a constant dependent solely upon the geometry of the bearing and the characteristics of the oil. This then represents a considerable advance beyond conventional hydrostatic bearings.

Still, with the temperature nevertheless increasing as a function of speed, limits will again be reached very rapidly. If it is desired for example to increase the speed of rotation of the spindle, the preceding problems will again arise and it will be necessary to widen the clearance between the spindle and the bearing. Since this type of bearing is self-pressurizing, the clearance entails a low-speed limit upon its use because the rigidity of the bearing, that is, the quotient of the change in pressure within the bearing divided by the change in operating clearance, is proportional to the speed of the spindle and is thus liable to become insufficient when the speed falls below a predetermined lower limit. Such self-pressurizing hydrostatic bearings are therefore not universally applicable and cannot be recommended for spindles rotating at a substantially high speed of rotation.

Furthermore, the supply of fluid to the cushioning pockets is, in accordance with such prior art invention, by way of a channel adjoining each pocket. Such a configuration does not allow the supply channel to have a substantial length which limits the pressure within the pockets since such is directly proportional to the length of the channels as is demonstrated within the description of the aforenoted prior art invention.

SUMMARY OF THE INVENTION

Accordingly, it is an object of the present invention to remedy the disadvantages found within the hydrostatic bearings representing the state-of-the-art, and in particular, to permit the realization of a self-pressurizing, self-compensating bearing.

Another object of the present invention is to realize a self-pressurizing hydrostatic bearing which automatically compensates for changes in the spindle rate of rotation, the operating characteristics varying as a function of such rotational rate in such a manner that the bearing operates, over a substantially broad range of speeds, without significant heating of the cushioning fluid and without a rapid decrease in the bearing rigidity at low rotational speeds, this adaptation of the bearing occurring automatically with no need for external control means whereby the bearing is in fact self-compensating.

Still another object of the present invention is the realization of a hydrostatic bearing within which the increase in temperature of the fluid leaving the bearing as the rate of rotation of the spindle increases is nullified or greatly diminished.

Yet another object of the present invention is to realize a self-pressurizing hydrostatic bearing within which the pressure within the cushioning pockets at a given speed is significantly greater than that attainable within the known self-pressurizing hydrostatic bearings.

The foregoing objectives are achieved according to the present invention through the provision of a self-pressurizing hydrostatic bearing which is intended to support a rotating shaft and which comprises a bearing element having several pockets each pressurized, during rotation of the shaft relative to the bearing element, by means of a supply channel. The pockets and channels are bounded and defined by means of sealing lands integrally formed with the bearing element and extending to within a very small distance from the peripheral surface of the rotating shaft. The self-pressurizing hydrostatic bearing of the present invention is further characterized by the fact that the aforementioned bearing element is made in such a manner that it can deform radially under the action of the fluid pressure within the cushioning pockets and thereby increase the distance between the sealing lands and the external surface of the rotating shaft when the rotational speed of the shaft increases, such practically nullifying or at least greatly diminishing the rise in temperature of the fluid leaving the bearing.

More particularly, within one embodiment of the bearing of the present invention, which is more particularly suited to support radial loads, the bearing element includes a thin bushing a portion of which is provided with the pockets and channels for pressurizing the fluid upon its inner surface. The thin bushing is mounted within a bearing support housing, an annular space being defined and maintained between a portion of the external, peripheral surface of the thin bushing and the support housing so as to allow radial deformation of the thin bushing under the influence of the pressure within the cushioning pockets.

Within another embodiment of a hydrostatic bearing constructed according to the present invention, more particularly suitable for the support of axial as well as radial loads, the bearing has in addition a flange, for imparting axial support, which is also furnished with cushioning pockets upon two working faces thereof, and with fluid-supply channels. One of the working faces of the axial-support flange is disposed relative to the working face of a first shoulder of the rotating shaft, while the other working face of the flange is disposed relative to another adjacent collar which is subjected to an essentially constant axial force. In this manner there is obtained two axial, self-pressurizing hydrostatic bearings, the operating clearance of each being able to increase with a corresponding increase in the speed of rotation of the shaft which undergoes an axial displacement and produces a self-compensation of the axial bearings.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout several views and wherein.

DETAILED DESCRIPTION OF THE PREFERRED EMBODIMENTS

Figure 1:
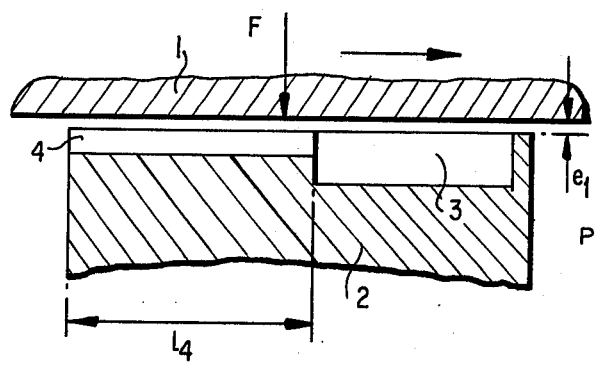
FIG. 1 is a schematic sectional view of a cushioning pocket and pressurizing channel of a known type of self-pressurizing the hydrostatic bearing system taken along line I—I of FIG. 2.
Figure 2:
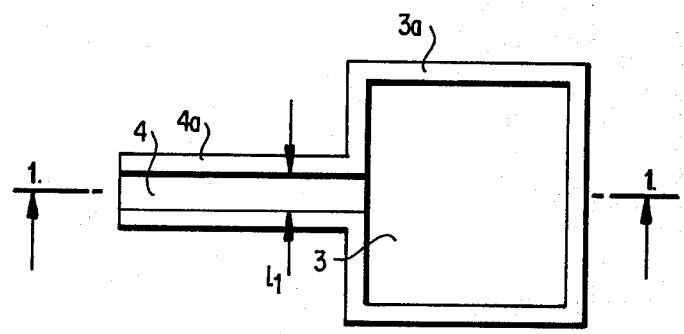
FIG. 2 is a plan view of the stationary element of the bearing shown in FIG. 1.

Referring now to the drawings, and more particularly to FIGS. 1 and 2 thereof, there is shown a known type of self-pressurizing hydrotstatic bearing system which includes an element 1 which is movable in the direction of the arrow with respect to a fixed bearing element 2 the latter of which includes a cushioning pocket 3 communicating with a pressurizing channel 4 of width $l_1$ and length $l_4$. The pocket 3 and channel 4 are bounded or defined by means of peripheral sealing lands 3a and 4a which extend to within a small distance $e_1$ of the surface of the movable element 1. This gap $e_1$ permits a predetermined amount of leakage of the cushioning fluid supplied to the pocket 3 by means of the channel 4 when the element 1 is translated in the direction of the arrow and subjected to a force F.

If the effects of the energy dissipated as a result of the viscosity of the fluid are neglected, it can be demonstrated that the pressure $p$ prevailing within the cushioning pocket 3 is a linear function of the viscosity $\mu$ of the fluid and of the velocity $V$ of the movable element with respect to the bearing. There is thus obtained the following relation:

$$p = \mu V G \qquad (1)$$

wherein $G$ is a complex function of the geometrical configurations of the bearing, the pocket and the supply channel as well as of the gap $e_1$.

In a similar manner, it can likewise be shown that the leakage flow $Q$ of the bearing may be expressed as follows:

$$Q = H - (p/\mu) K \qquad (2)$$

wherein $H$ is a linear function of the velocity $V$ and of certain dimensions of the supply channel while $K$ is a complex function of the geometrical configurations of the pocket, the bearing and the supply channel as well as of the gap $e_1$, and consequently, it is seen that the leakage flow $Q$ is a linearly increasing function of the velocity $V$ since the two terms of Equation (2) increase in proportion to the velocity $V$, and the cushioning force of the bearing, being proportional to the pressure $p$, is also proportional to the velocity $V$.

It can additionally be shown that the rigidity $R$ of the bearing, that is, the quotient of the change in the force $F$ acting upon the bearing, divided by the change in the gap $e_1$ separating the two elements of the bearing, is a linearly increasing function of the viscosity $\mu$ of the fluid and of the velocity $V$ of the movable element, the following relationship being applicable.

$$R = \mu V L \qquad (3)$$

wherein $L$ is a function of the dimensional characteristics of the bearing.

Still further, it can also be shown that the power or work $W$ dissipated by means of the bearing is essentially proportional to the square of the velocity $V$ and inversely proportional to the gap $e_1$, as set forth in the following expression:

$$W = (\mu V^2/e_1) M \qquad (4)$$

wherein $M$ is a complex function of the various dimensions of the bearing as well as of the supply channel.

As the leakage flow $Q$ is proportional to the relative velocity $V$ while the dissipated power or work $W$ is proportional to the square of the same relative velocity, it is seen that the temperature variation of the fluid is essentially a linearly increasing function of the relative velocity as may be expressed as follows:

$$\Delta T = (W/Q) c \qquad (5)$$

wherein $\Delta T$ is the temperature rise and $c$ is a constant dependent upon the characteristic of the hydraulic oil used. As a result, the following expression is readily obtained:

$$\Delta T = K V \qquad (6)$$

In practice, the temperature rise is limited due to the fact that the fluid viscosity decreases with a corresponding temperature increase which in turn leads to a decrease in the energy dissipated $W$, and the result is that the expression or equation representing the temperature rise $\Delta T$ of the oil, as a function of the velocity, has an essentially linear form, the slope simply tending to decrease when the velocity increases greatly.

In order to correct this unfavorable result, the present invention proposes to control the thickness $e_1$ of the oil film separating the two elements of the bearing. It is seen for example, with reference to FIG. 1, that in order to vary the gap $e_1$, it should be possible to control the supporting force $-F$, that is the pressure within the bearing whereby as seen of formulas 1 to 5 set forth hereinabove a decrease in $\Delta T$ would then be obtained. Within a practical embodiment of a radial bearing as disclosed within FIGS. 1 and 2 however, it is not readily possible to change the load in order to vary the gap $e_1$ given that the bearing element completely surrounds the rotating shaft.

Figure 3:
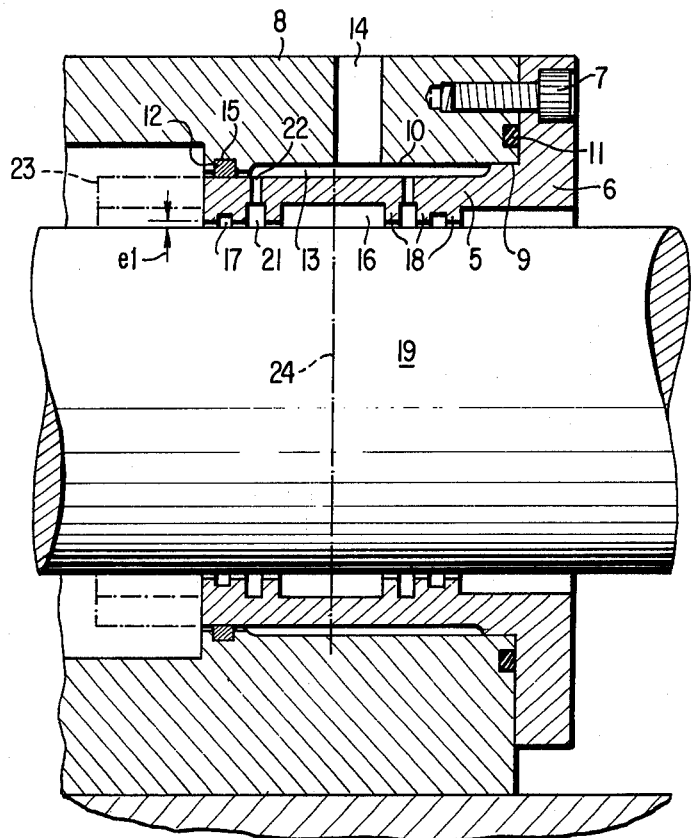
FIG. 3 is a schematic sectional view of one embodiment of a self-pressurizing, self-compensating hydrostatic bearing constructed according to the present invention, which is particularly suited for supporting radial loads, which is shown in FIG. 4, taken along the line III—III of FIG. 4.
Figure 4:
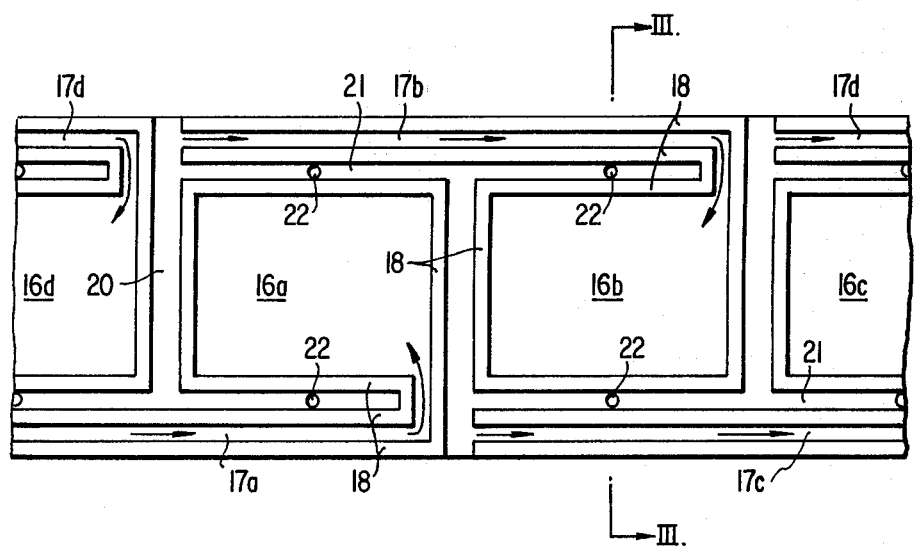
FIG. 4 is a schematic development view of the internal peripheral surface of the bearing of FIG. 3 sectioned longitudinally.

Turning then to FIGS. 3 and 4, there is shown one embodiment of a self-pressurizing and self-compensating hydrostatic bearing constructed according to the present invention, comprising a thin annular bushing 5 rigidly attached by means of an end flange 6 and a screw fastener 7 to a bearing support housing 8, it being noted that the radial thickness of bushing 5 is greatly exaggerated within the drawings in order to facilitate understanding of the invention. The bushing 5 is precisely centered within housing 8 by means of a short axially extending, centering section 9 and a gap is defined between bushing 5 and the bore 10 of housing 8 as a result of the seating of bushing 5 through means of section 9, sealing within the radial and axial directions being accomplished by means of O-ring seals 11 and 12 respectively.

There is thus provided a sealed annular space 13 between the thin bushing 5 and the bore 10 of housing 8 which can be supplied with cushioning fluid through means of a radial bore 14 provided within housing 8 and opening into the space or chamber 13. It should be noted that the seal 12, effective in the axial direction, is mounted within an annular groove 15 provided within housing 8, the lip portions of housing 8 defining groove 15 not being in contact with the outer surface of bushing 5 so as to permit the latter to undergo radial movement.

The cushioning pockets 16 and the pressurizing channels 17 of the pockets are seen in greater detail within FIG. 4 which is a development view of bushing 5. Within the embodiment illustrated, the bearing includes four cushioning pockets 16a, 16b, 16c and 16d, each pocket being supplied with cushioning fluid by means of a pressurizing channel 17a, 17b, 17c or 17d respectively, the fluid moving in the directions of the arrows as seen in the FIGURE. The pockets 16 and supply channels 17 are bounded and defined by means of the sealing lands 18 which extend radially to within a very short distance $e_1$, as seen in FIG. 3, from the rotating spindle 19, and axial and radial channels 20 and 21, respectively, are also provided with bushing 5 and into which the pressurizing fluid is introduced by means of radial passageways 22 which communicate directly with the annular space 13 which is of course fluidically connected with and supplied through bore 14.

As can be observed from FIG. 4 each of the supply channels 17 associated with the pockets 16 not only occupies a position contiguous to the corresponding pocket but is also disposed so as to be contiguous to the immediately preceding pocket. In order to facilitate the operativeness of this particular arrangement, the supply channels are disposed alternatley upon opposite sides of the pockets 16 in an overlapping fashion, such as for example, channel 17a of cushioning pocket 16a being disposed at the bottom of the bearing structure as viewed in FIG. 4 while channel 17b of pocket 16b is at the top of such structure. It is thus apparent that in this manner it is possible to double the length of the supply channels 17 and consequently to double the pressure within the chambers or pockets 16.

The operation of the bearing of the present invention will now be briefly described. As the speed of rotation of spindle 19 is increased, the pressure within the pockets 16 also increases. The bushing 5, being rather thin, deforms radially outwardly so as to permit the enlargement of gap $e_1$ between the sealing lands 18 and the surface of the rotating spindle 19. The result is an increase in leakage flow and a decrease in work or power dissipation, the temperature of the return fluid thus increasing no further, or at least only very slightly. Moreover, as the pressure increases with the speed of rotation of spindle 19, the rigidity of the bearing definitely increases or, at least does not decrease, it being noted that the radial elasticity of the thin bushing 5 does not detract whatever from its mechanical rigidity. In fact, as the bushing 5 has a large diameter and short length, it works practically entirely in shear conditions and its section is quite sufficient in order to assure high mechanical rigidity.

The increase in internal diameter of the thin bushing 5 is accompanied by a slight retraction thereof since one of the ends of the bushing is practically imprisoned or confined within housing 8 by means of attaching flange 6. It is possible to compensate for this retraction by prolonging the bushing 5 by means of an annular, axial extension 23 shown in phantom lines within FIG. 3. As the material comprising the annular extension 23 is not being submitted to the radial force exerted by means of the pressure within the pockets 16 of the bearing, it resists the deformation of the bushing 5, and consequently, by appropriately choosing the length of extension 23, it is quite simple to render the deformation of bushing 5 essentially symmetric with respect to the median plane 24.

Computation discloses that in order to completely nullify the temperature rise with increasing speed of rotation of the spindle, it would theoretically be necessary to maintain the pressure constant within the pockets 16 of the hydrostatic bearing regardless of the speed of the spindle. In other words, the radial rigidity of the bushing 5 would have to be zero which is clearly impossible to realize in practice. One will therefore choose a bushing of as small a thickness as possible in view of the radial rigidity sought. By way of example, if the diameter of the spindle 19 is 70 mm, the depth of the pockets 16 will be on the order of 1 mm and the thickness of the radially outward portion of bushing 5 defining the pockets about 2 mm, the outer diameter of the bushing thus being approximately 76 mm. Assuming that the bushing is made of steel, it will undergo diametercal expansion of approximately 0.01 mm for a pressure of approximately 20 bars within the pockets 16. One would then choose the diameter of the bushing, under zero pressure conditions, as a function of this deformation, and thus, in an operative embodiment, the gap $e_1$ will be 0.01 mm at zero speed, while at a speed of rotation of 6,000 RPM the gap $e_1$ will be 0.02 mm for a pressure of approximately 20 bars within the pockets.

As a result of such operational parameters, it is apparent that, with the aid of the equations set forth hereinabove, the temperature is maintained substantially constant over a very broad speed range. In addition, it will also be appreciated that the bearing of the present invention is quite compact in the radial direction, and still further, it should also be realized that even though the bearing must have as little radial rigidity as possible so as to be able to deform easily within the radial direction, it must nevertheless retain a high degree of rigidity against flexure when considered in its entirety. In view of such, various embodiments of a bearing conforming with the principles of the present invention are possible, a particular embodiment being appropriate to a particular situation or desired application.

Figure 5:
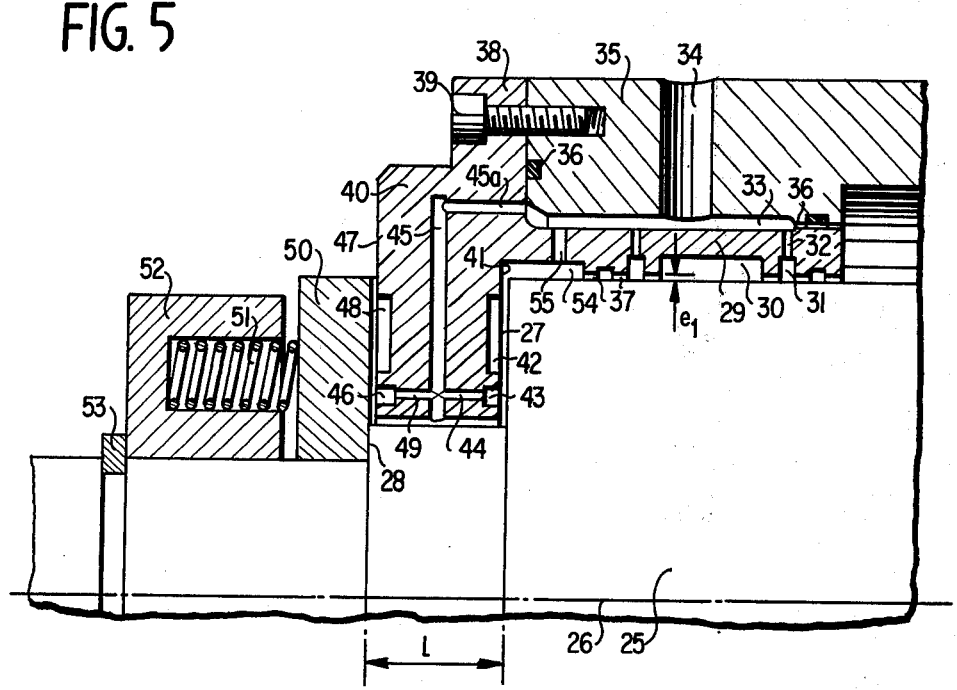
FIG. 5 is a schematic sectional view of another embodiment of a self-pressurizing, self-compensating hydrostatic bearing constructed according to the present invention, which is particularly suited for the support of axial and radial loads.

Referring now to FIG. 5, there is disclosed a partial view of another embodiment of a bearing constructed in accordance with the present invention and which can simultaneously withstand radial and axial loads. A rotating spindle 25 having a longitudinal axis 26 includes a first shoulder having a working face 27 and a second shoulder having a working face 28, the length of the spindle between faces 27 and 28 being designated $l$. The spindle 25 is radially supported by means of a self-pressurizing and self-compensating hydrostatic bearing similar in principle and general structure to the bearing disclosed within FIGS. 3 and 4, the radial bearing of this embodiment comprising a thin bushing 29 provided with pockets 30 within its radial inner face which are supplied with fluid by means of channels 31. The fluid is introduced into channels 31 through means of radial passages 32 which in turn fluidically communicate with an annular space 33 and a radial bore 34 provided within the bearing housing 35. The annular space 33 is sealed by means of two O-ring seals 36, and it should be noted that the thickness of the bushing 29 has been greatly exaggerated within the FIGURE so as to facilitate an understanding of the invention.

When the speed of rotation of spindle 25 increases, the pressure within the pockets 30 also increases which of course causes the radially outward deformation bushing 29 and thus an enlargement of the gap $e_1$ between the sealing lands 37 and the surface of the spindle 25. The thin bushing 29 is fastened to the bearing housing 35 by means of a flange 38 and a screw fastener 39, the flange 38 being substantially extended in the axial direction so as to form a collar 40 for axial support. One of the faces 41 of collar 40 is disposed adjacent to the surface 27 of the first shoulder of spindle 25 and at least one pocket 42 is provided within collar 40 and is supplied with fluid by means of a channel 43 and axially extending passage 44, radial passage 45, and axially extending passage 45a which fluidically communicates with the annular space 33. The fluid leaving pocket 42 can enter into an annular space or chamber 54 so as to escape into annular space 33 through means of a radial passage 55, it being noted that a single pocket 42 upon face 41 of the axial-support collar 40 is sufficient given that the axis 26 of the spindle 25 is firmly oriented by means of the radial bearing comprising bushing 29 and pockets 30.

The other outer face 47 of the axial-support collar 40 is also provided with a self-pressurizing hydrostatic bearing, similar in principle to those described above, comprising several cushioning pockets 48 pressurized by means of supply channels 46 and an axially extending passage 49 which, similar to passage 44, also communicates with the aforementioned passages 45 and 45a. In practice it is advantageous to provide three pockets 48 upon the face 47 of the axial-support collar 40. The overall thickness of axial-support collar 40 is chosen to be slightly less than the length $l$ of spindle 25 which defines the axial distance between shoulder faces 27 and 28, and in this manner another collar 50 can be maintained against the working face 28 of spindle 25 with a slight separation from the face 47 of axial-support collar 40. This separation or operating clearance is determined by the operating conditions of the spindle and can be adjusted by varying the length *l* of the various shoulder portions of the spindle which can possibly be incorporated upon spindle 25 within further embodiments of the present invention, not shown.

The collar 50 cooperates with the working face 47 of axial-support collar 40 so as to form therewith an axial, self-pressurizing hydrostatic bearing which includes the pockets 48. Springs 51, disposed within a holder 52 axially retained upon spindle 25 by means of a retaining ring 53 or other suitable means, exert an essentially constant force upon collar 50, the stiffness of the springs 51 being preferably chosen so as to be rather low so that the force exerted in fact remains essentially constant. Within this embodiment then, the axial bearing will have sufficient rigidity in spite of the high compliance of the springs 51, given that the hydrostatic bearing formed by means of the pocket 42 and the face 27 of the first shoulder of spindle 25 has a high degree of rigidity.

In operation of the bearing of this embodiment, as the speed of rotation of spindle 25 increases, there initially occurs a radial deformation of the thin bushing 29 of the radial bearing which limits the temperature rise as noted hereinbefore above. The increase in speed of rotation of the spindle 25 also causes the pressure to rise within the pockets 42 and 48 under the action of which the spindle 25 is axially displaced slightly toward the right as seen in FIG. 5 so that the operating clearance within the axial bearings, established by means of the axial-support collar 40 increases as a function of the speed of rotation of the spindle which, as before, allows the temperature of the exiting cushioning fluid to be maintained essentially constant.

Thus, it is seen that there has been realized a self-pressurizing and self-compensating hydrostatic bearing having the aforenoted advantages and which is capable of supporting radial and axial loads. The present invention can be used particularly within machine tools so as to adequately support spindles which must rotate at varying speeds over a very large speed range and up to and including very high speeds, the maximum and minimum speeds possibly having a ratio of 10 to 1 or even 20 to 1.

Obviously, many modifications and variations of the present invention are possible in light of the above teachings. It is to be understood therefore that within the scope of the appended claims the present invention may be practiced otherwise than as specifically described herein.

What is claimed as new and desired to be secured by the Letter Patent of the United States is:

1. A self-pressurizing hydrostatic bearing intended to support a rotating shaft, comprising:
   a bearing element including a plurality of pockets each of which is respectively pressurized, in response to the rotation of said shaft relative to said bearing element, by means of a fluid supply channel;
   said pockets and channels being bounded and defined by means of sealing lands integral with said bearing element, said lands extending to within a very short distance from said shaft so as to define a gap therebetween; and
   wherein said bearing element is deformable radially outwardly under the influence of said pressure within said pockets,
   whereby said gap defined between said lands and said shaft increases as said pressure increases in response to the increasing rate of rotation of said shaft so as to permit the temperature rise of the fluid leaving said bearing, as said speed increases, to be substantially nullified.

2. A hydrostatic bearing as set forth in claim 1 wherein said bearing element comprises:
   a thin bushing;
   said pockets and channels being disposed upon the inner surface of said bushing;
   said bushing being mounted within a bearing housing; and
   an annular chamber being defined and maintained between a portion of the outer periphery of said bushing and said bearing housing so as to permit said deformation of said thin bushing in said radial direction under the action of said pressurized fluid.

3. A hydrostatic bearing as set forth in claim 2 further comprising means for fluidically sealing said annular chamber and for fluidically providing a low pressure cushioning fluid to said chamber as well as to said channels formed upon the inner surface of said housing.

4. A hydrostatic bearing as set forth in claim 2 wherein said thin bushing further comprises:
   an annular extension which extends longitudinally beyond that portion of said bushing which includes said pockets and said channels supplying fluid to said pockets,
   whereby the radial deformation of said bushing is symmetric about a median plane thereof.

5. A hydrostatic bearing as set forth in claim 2 where said thin bushing is integrally formed with a flange member which permits the attachment of said bushing to said bearing housing without adversely affecting the radial deformation of said bushing.

6. A hydrostatic bearing as set forth in claim 5, wherein said pockets formed within said bushing are located at such a distance from said attachment flange that all of said sealing lands deform radially to essentially the same degree under the action of said pressure within said pockets.

7. A hydrostatic bearing as set forth in claim 1 and which is adapted to support radial, as well as axial loads, further comprising:
   an axial-support collar, one working face of which has at least one pocket and a channel for pressurizing said one pocket, and which operatively cooperates with the working face of a shoulder portion of said shaft so as to form therewith a first self-pressurizing hydrostatic axial bearing;
   said collar further including a second working face, provided with a plurality of pockets and channels for pressurizing said plurality of pockets within said second working face, which operatively cooperates with the working face of an adjacent collar which is subjected to an essentially constant axial force so as to form therewith a second self-pressurizing, hydrostatic axial bearing,
   the bearing spaces defined between said cooperating working faces of said first and second axial bearings being capable of increasing in size as the speed of rotation of said shaft increases.

8. A hydrostatic bearing as set forth in claim 7, wherein:
   the thickness of said axial-support collar is slightly less than the axial length of said shoulder portion of said shaft
   whereby said adjacent collar is able to cooperate with said collar in defining said second axial bearing.

9. A hydrostatic bearing as set forth in claim 7 wherein said constant axial force is imparted to said adjacent collar by means of springs acting upon the outer working face of said adjacent collar.

10. A hydrostatic bearing as set forth in claim 7, wherein said second self-pressurizing hydrostatic axial bearing comprises three cushioning pockets and supply channels.

11. A hydrostatic bearing as set forth in claim 1, wherein:
each supply channel is disposed contiguously to its respective pocket in the direction of relative displacement between said bearing and said shaft, and wherein further, each of said channels also extend contiguously along the pocket immediately preceding said respective pocket,
whereby the length of said supply channels is increased.

12. A hydrostatic bearing as set forth in claim 11, wherein:
said supply channels of said pockets are disposed alternately upon opposite sides of said pockets,
whereby the length of said channels is effectively double the length it would be if all of said channels were disposed upon the same side of said pockets.

* * * * *